(12) United States Patent
Toda (10) Patent No.: US 7,535,589 B2
(45) Date of Patent: May 19, 2009

(54) PRINT CONTROL APPARATUS, PRINT CONTROL METHOD AND PRINTING SYSTEM

(75) Inventor: Masanari Toda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 969 days.

(21) Appl. No.: 10/834,216

(22) Filed: Apr. 29, 2004

(65) Prior Publication Data

US 2004/0252339 A1 Dec. 16, 2004

(30) Foreign Application Priority Data

May 2, 2003 (JP) .............................. 2003-127288

(51) Int. Cl.
*G06F 3/12* (2006.01)
(52) U.S. Cl. ..................... 358/1.15; 358/1.16; 358/1.17
(58) Field of Classification Search .................. 358/1.9, 358/1.13, 1.15, 1.16, 1.2, 1.17, 400
See application file for complete search history.

(56) References Cited

U.S. PATENT DOCUMENTS

| | | | |
|---|---|---|---|
| 5,136,688 A | | 8/1992 | Morikawa et al. |
| 5,594,860 A | * | 1/1997 | Gauthier ...................... 345/543 |
| 6,219,156 B1 | * | 4/2001 | Yoshida et al. ......... 358/426.07 |
| 6,512,595 B1 | | 1/2003 | Toda .......................... 358/1.9 |
| 6,556,309 B1 | * | 4/2003 | Campbell et al. .......... 358/1.16 |
| 2003/0011819 A1 | | 1/2003 | Toda ......................... 358/1.15 |
| 2003/0133141 A1 | | 7/2003 | Toda et al. ................. 358/1.13 |

FOREIGN PATENT DOCUMENTS

| | | |
|---|---|---|
| JP | 3114856 A | 5/1991 |
| JP | 2000165633 A | 6/2000 |
| JP | 2000207147 A | 7/2000 |
| JP | 2003015834 A | 1/2003 |

OTHER PUBLICATIONS

Japanese Office Action dated Jan. 6, 2009 in corresponding Japanese Application No. 2003-127288.

* cited by examiner

*Primary Examiner*—King Y Poon
*Assistant Examiner*—Jamares Washington
(74) *Attorney, Agent, or Firm*—Fitzpatrick, Cella, Harper & Scinto (57) ABSTRACT

A print control apparatus, method and system that acquire a first band area for storing band data of a predetermined size according to band information for processing by a printer device. Print commands are divided into each band in which a printer device processes, and stored into the first band area in band units. If the print commands corresponding to a particular band cannot be stored in the first band area, a memory area for storing the print command is acquired as a second band area, the print commands stored in the first and second band areas are linked, and the linked print commands are transmitted to the printer device.

8 Claims, 7 Drawing Sheets

PRINT CONTROL APPARATUS, PRINT CONTROL METHOD AND PRINTING SYSTEM

FIELD OF THE INVENTION

The present invention relates to a print control apparatus, print control method and printing system, and more particularly, to a print control apparatus, print control method and printing system that analyze a draw command, generate a print command and transmit the print command to a printer device to print an image corresponding to the draw command.

BACKGROUND OF THE INVENTION

Figure 2:
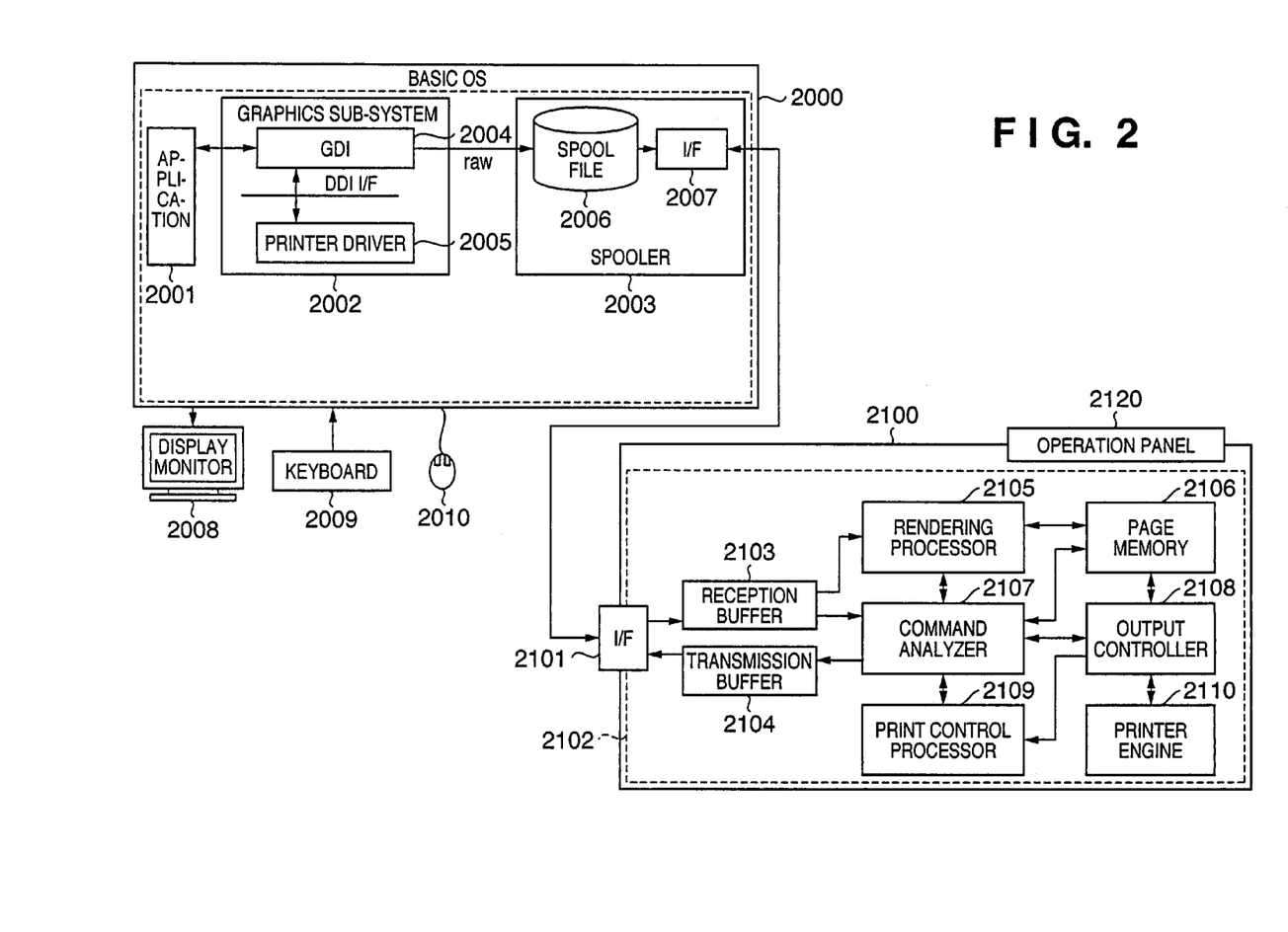
FIG. 2 depicts a block diagram showing a basic overall construction of a conventional printing system.

FIG. 2 is a block diagram showing the basic overall construction of a conventional printing system.

Generally, as shown in FIG. 2, a host computer 2000 and a printer device 2100 connected through a parallel communications means called a centronics interface and a network communications means form a printing system.

The host computer 2000 runs word processor, spreadsheet and other such application software 2001 (hereinafter "applications") on a so-called operating system (OS) such as Windows (Microsoft Corp. registered trademark). When using an application 2001 to print, such printing is carried out using functions of a graphic sub-system 2002 of a number of sub-systems provided from that program by the OS. In Windows™ this graphic sub-system 2002 is called a GDI 2004 (Graphical Device Interface), and controls the processing of image data for the display and the printer. In order to accommodate dependency on each display and printer device, the GDI 2004 actively links a module called a device driver to process output to each of these devices. The module for the printer device 2100 is called a printer driver 2005. At the printer driver 2005, it is necessary to prepare a function group called a DDI (Device Driver Interface) that is already determined to be loaded into the device driver according to the capabilities and functions of the device. When the GDI 2004 converts an API (Application Programming Interface) call by the application 2001 into data for the device driver and the DDI function group is called by the appropriate GDI 2004 so as to execute a predetermined print process. Thus print requests from the application 2001 are sequentially processed through the printer driver 2005 by the GDI 2004. The printer driver 2005 has functions having an image mode that renders data up to an output image data format and a PDL (Printer Description Language) mode that generates PDL commands for a rendering-processible printer.

First, a description is given of the PDL mode type of printer driver.

The printer driver 2005 is configured to generate a PDL command with every DDI function. The generated print commands are sequentially stored as a single-page spool file 2006 through the GDI 2004. When data of one page has been stored, the data is sent to the printer device 2100 via an I/F 2007.

When the printer device 2100 receives the print command, the printer device 2100 temporarily stores the print command in a reception buffer 2103 and analyzes it at a command analyzer 2007. As a result of that analysis, intermediate data that can be processed at high speed by the printer device 2100 is generated and stored in an intermediate language storage area of a page memory 2106. When a page of such intermediate data is stored in the page memory 2106, a list structure (hereinafter "band list") is created in order of registration for each band area that is a processing unit in the printer device 2100. The intermediate language linked to the band list is converted into image data rendered for the band memory area within the page memory 2106 by the hardware and the software.

The image data thus rendered in the band memory is converted into a video signal ("shipping") in synchronism with an operation of a printer engine 2110. By preparing two such band memory areas and using them alternatively, it is possible to synchronize rendering and shipping with the operation of the printer engine 2110 within a small memory area. However, in the PDL mode processing described above, all the data gotten from the DDI function is generated as draw commands, and therefore PDL commands are generated only to the extent that the application 2001 issues a large number of draw commands. By contrast, however, the memory capacity of the printer device 2100 is limited, and therefore the printer device 2100 implements printing with methods like the following.

[A] Sub-close Method

1. When the amount of intermediate language data no longer fits into the page memory, the intermediate language data stored up to that point is rendered in the band memory and compressed (using PackBits, Run-Length, JPEG compression, etc.), and held as intermediate data (for all bands relating to the drawing object).

2. The intermediate language data that has been rendered is erased, thus increasing empty memory area in the page memory.

3. The intermediate language data that previously could not be stored is now stored in the empty memory area. If an entire data of a page does fit, then compressed image data generated in above (1) is treated as intermediate language data, making the rendering in a band unit possible in synchronism with the operation of the printer engine (synchronized band rendering processing).

4. If data of the page still does not fit after the processings described above are performed, then the process described in above (1) is carried out once more (that is, already-registered compressed image data is rendered first and then new intermediate data is rendered, after which the rendered image data is re-compressed).

[B] Pre-band Method

When intermediate language data is concentrated at a single band, the rendering processes is sometimes not up to the print speed of a printer engine. In that case, when the intermediate language data is registered in the printer device, the intermediate language data is rendered in the band memory before activating the printer engine with respect to the band in which the intermediate language data is concentrated.

By the methods described above, proper printing is guaranteed. However, because the synchronized band rendering-processing is not possible at high speed, a deterioration in performance does occur. Moreover, when printing using an application that generates large numbers of print commands, the PDL printer performance declines drastically.

SUMMARY OF THE INVENTION

The present invention is conceived in consideration of the above-described conventional art, and has as its feature to provide a print control apparatus, print control method and printing system that can achieve proper and high-speed printing even when the amount of print commands is large, within a limited memory size environment.

According to an aspect of the present invention, there is provided with a print control apparatus that analyzes a draw command, generates print commands and transmits the print commands to a printer device to print, the apparatus comprising:

acquisition means for acquiring band information for processing by the printer device;

securing means for securing a first band area for storing a predetermined amount of print commands according to the band information;

management means for dividing the print commands into units of bands for processing by the printer device and storing the divided print commands in band units in the first band area, and in a case where the print commands corresponding to a band cannot be stored in the first band area, for acquiring a memory area for storing the print commands corresponding to the band and managing the acquired memory area as a second band area;

linking means for linking the print commands stored in the first band area and the print commands stored in the second band area;

transmission means for transmitting the print commands stored in the first band area and the print commands of the second band area linked with the print command of the first band area; and release means for releasing the first and second band areas that stored the print commands transmitted by the transmitting means, wherein print commands of a page is divided into bands and transmitted to the printer device by repeatedly reusing a memory area of the band area released by the release means.

Other features, objects and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention are now described in detail in accordance with the accompanying drawings.

In order to facilitate an understanding of the present invention, before processing to a description of the structure of an embodiment of the present invention, a description is first given of the structure of a laser beam printer (hereinafter also "LBP") that undertakes the printing of a printing system adapting the embodiment of the present invention, with reference to FIG. 1.

Figure 1:
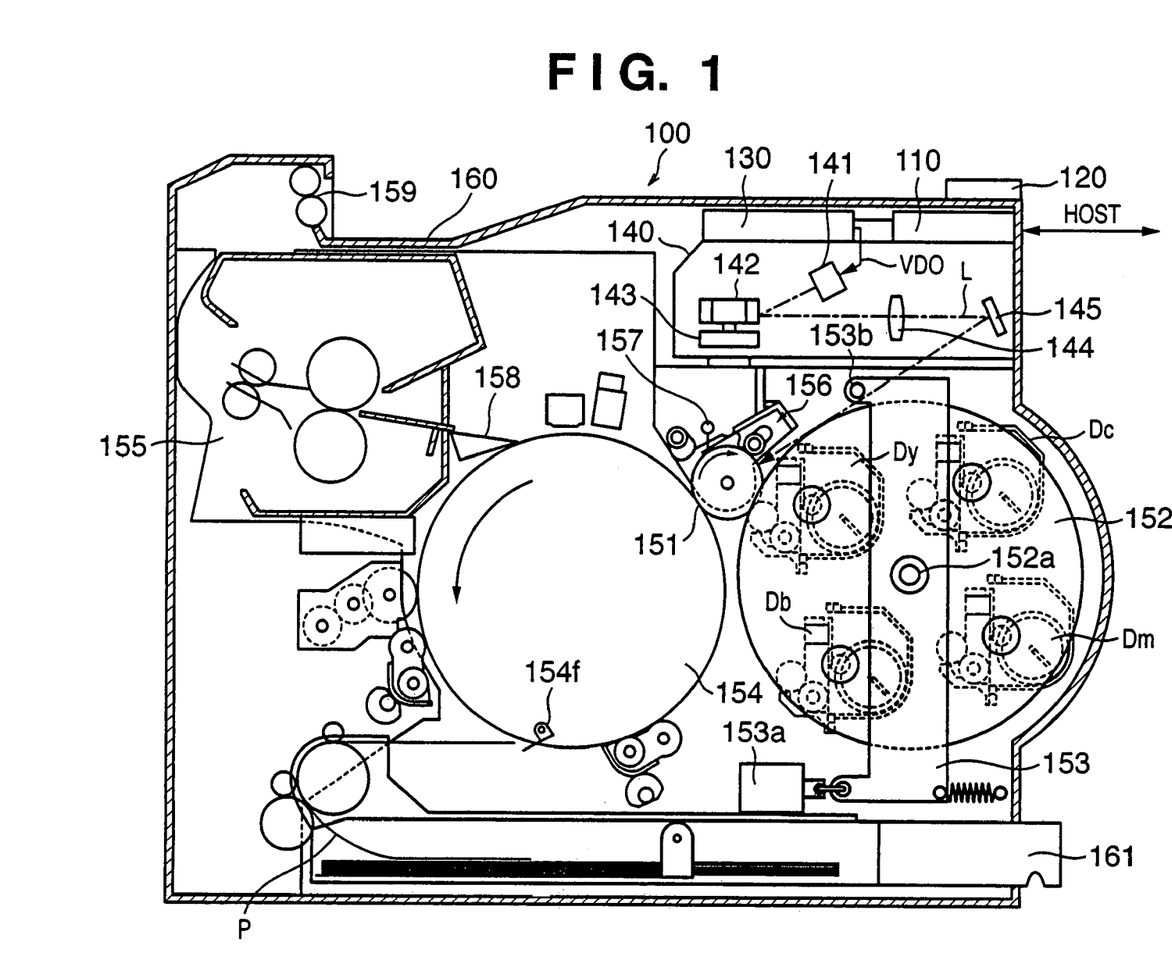
FIG. 1 depicts a block diagram showing a structure of a laser beam printer (LBP) according to an embodiment of the present invention.

FIG. 1 depicts a block diagram showing a sectional view of a structure of a laser beam printer according to the embodiment of the present invention, specifically, a laser beam printer LBP 100. The description that follows is of a color LBP having a resolution of 600 dpi, performing image printing based on multivalued data in which each picture element (pixel) of each color component is expressed in 8 bits.

In FIG. 1, reference numeral 100 denotes an LBP main unit, which inputs and stores print information including control codes and print data (character codes and image data, etc.) supplied from a host computer (reference numeral 3000 in FIG. 3) connected externally to the LBP 100 and which also produces corresponding character patterns and images according to such information and prints an image on the recording paper that is a recording medium. Reference numeral 110 denotes a formatter controller, which analyzes the print information supplied from the host computer and generates a print image, and which also controls the operation of the LBP 100. Additionally, the formatter controller 110 is connected to an operation panel 120 having a variety of switches and LED instruments for user operation and for notifying the user of the operating state of the apparatus. The operation panel 120 is arranged as a part of the external housing of the LBP 100. The final print image (bit map image data) generated by the formatter controller 110 is transmitted as a video signal to an output controller 130. The output controller 130 inputs status information from a variety of sensors (not shown) of the LBP 100 and outputs control signals to an optical unit 140 and a variety of drive system mechanisms to control printing as an LBP.

In the LBP 100 shown in FIG. 1, a leading edge of a sheet of paper P supplied from a paper supply cassette 161 is gripped by a gripper 154f and held against an outer periphery of a transfer drum 154. Electrostatic latent images of each color formed on a photosensitive drum 151 by the optical unit 140, which are developed by developers Dy, Dm, Dc and Db of the colors yellow (Y), magenta (M), cyan (C) and Black (B), respectively, are transferred multiple times to the sheet of paper P around the outside of the transfer drum 154 to form a multi-colored image. Thereafter, the sheet of paper P is separated from the transfer drum 154, fixed by a fixing unit 155 and discharged to a paper discharge tray 160 by a discharger 159.

The different colored developers Dy, Dm, Dc and Db have rotating support shafts at both ends, and are rotatably supported about the shafts by a developer selection mechanism 152. According to such an arrangement, the attitude of the developers Dy, Dm, Dc and Db can be maintained constant even as the developer selection mechanism 152 revolves around a rotation shaft 152a in order to select a developer as shown in FIG. 1. The developer selected by such rotation moves to a developing position, after which the developer selection unit 152 and the developer are supported as an integrated unit about a support point 153b and a selection mechanism support frame 153 pulls in the direction of the photosensitive drum 151 using a solenoid 153a, such that the selected developer is moved toward the photosensitive drum 151 to develop an electrostatic latent image of a color of the selected developer.

The surface of the photosensitive drum 151 is uniformly electrically charged to a predetermined polarity by a charger 156. At the formatter controller 110, print information rendered as a device-dependent bit map image is converted to a video signal VDO of a corresponding pattern and output to a laser driver to drive a semiconductor laser 141. The laser beam emitted from the semiconductor laser 141 is turned on and off according to the input video signal VDO, and further, is scanned by a polygon mirror 142 that is rotated at high speed by a scanner motor 143, and directed onto the photosensitive drum 151 as a scanning beam via a polygon lens 144 and a reflecting mirror 145, thereby forming an electrostatic latent image of an image on the photosensitive drum 151. Thus, for example, an electrostatic latent image M (magenta) is developed by the M (magenta) developer Dm and an M (magenta) first toner image is formed on the photosensitive drum 151.

At the same time, at a certain cycle the transfer paper P is fed forward and a transfer bias voltage of a polarity opposite that of the toner (for example positive) is applied to the transfer drum 154. As a result, the first toner image (M) on the photosensitive drum 151 is transferred to the transfer paper P and the transfer paper P is electrostatically stuck to the surface of the transfer drum 154. Thereafter, any excess M (magenta) colored toner remaining on the photosensitive drum 151 is removed by a cleaner 157 and the photosensitive drum 151 is readied for the next color electrostatic latent image formation and development process. Thereafter, by repeating the process as that described above, in the order of C (cyan), Y (yellow) and Bk (black), second, third and fourth color toner images, respectively, are transferred to the transfer paper P to print a full-color image on the paper P.

However, the process differs from that described above, in that, when transferring the color toners, a bias voltage greater than that applied the previous time is applied to the transfer drum 154. When the leading edge of the transfer paper P on which the four color images have been overlapped approaches a separation point, a separation blade 158 approaches and a leading edge thereof contacts the surface of the transfer drum 154 and separates the transfer paper P from the transfer drum 154. The transfer paper P thus separated is then conveyed to the fixing unit 155, where the toner image on the transfer paper P is fixed and the paper is discharged to the paper discharge tray 160.

The color laser beam printer (LBP) 100 according to the present embodiment forms an image of 600 dpi resolution through an image formation process like that described above. It should be noted that a printer capable of adapting the present invention is not limited to the color LBP according to the present embodiment. Thus, for example, an inkjet printer, a thermal printer or another type of printer may be used instead of the color LBP described above.

Next, a description is given of the formatter controller 110 of the LBP 100 according to the present embodiment.

Figure 3:
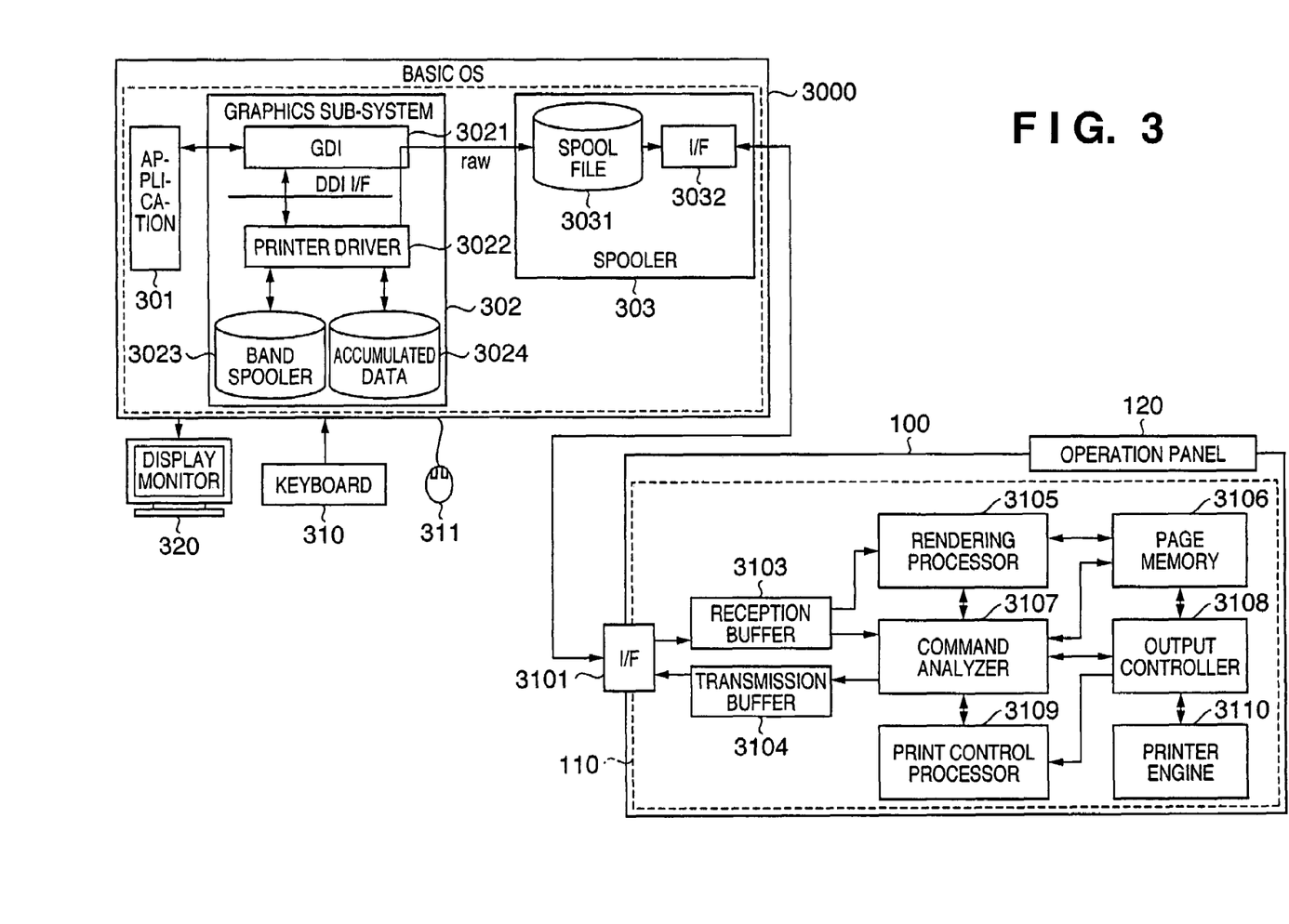
FIG. 3 depicts a block diagram showing a structure of a printing system according to the embodiment of the present invention.

FIG. 3 depicts a block diagram showing a structure of a printing system according to the embodiment of the present invention, including the LBP 100 according to the present embodiment and a host computer 3000.

The formatter controller 110 is a part that usually is also called a PDL controller, and comprises an interface (I/F) unit 3101 that is a connection means to the host computer 3000, a reception buffer 3103 for temporarily storing received data, a transmission buffer 3104 for temporarily storing transmission data, a command analyzer 3107 for controlling the analysis of the print data, a print control processor 3109, a rendering processor 3105 and a page memory 3106.

The interface (I/F) 3101 is a communication means for transmitting print data to and receiving print data from the host computer 3000, enabling communications based on a communications protocol such as, for example, IEEE-1284. The present embodiment, however, is not limited to such communications means, and therefore may be connected via a network by a variety of different protocols, or by a communications means based on the IEEE-1394 standard. The print data received through the interface 3101 is successively accumulated in the reception buffer 3103 that is the storage means for temporarily storing the print data, and is read out and processed by the command analyzer 3107 or the rendering processor 3105 as necessary. The command analyzer 3107 is composed of a control program according to a print command system and a print job control language, and analyzes print data related to rendering of characters, figures and images etc. Based on the results of that analysis, an instruction is given to the rendering processor 3105 and a rendering process is executed. Additionally, processing commands such as paper supply selection, reset commands and the like, other than rendering, are transmitted from the command analyzer 3107 to the print control processor 3109 and processed.

The rendering processor 3105 is a renderer that successively renders character and image drawing objects to the band memory of the page memory 3106. With the LBP 100 according to the present embodiment, it is necessary to transmit device-dependent bit map data successively in the order of MCYK. In a standard, it is not always acquire all the memory areas needed for the succeeding operation, and the band memory is acquired within the page memory 3106 as a band area for a fraction of one plane (comprised of 1, 2 or 4 bits/pixel), and rendering is carried out using the acquired band area. When the rendering for one band is completed, the rendered bit map image is compressed and moved to a different memory area, releasing the acquired band memory. By so doing, any increase in the memory size of the page memory 3106 of the LBP 100 can be suppressed.

When the compressed band bit map data of one page is generated as described above, the compressed bit map data is decoded and converted into the video signal VDO in synchronism with the print speed of the printer engine 3110, implementing the print process.

It should be noted that, in general, the formatter controller 110 comprises a computer system including a CPU, a read-only memory (ROM) and a random access memory (RAM). In addition, the processing performed by these components may be carried out in a time-sharing arrangement under the control of a multi-task monitor (real time OS). Alternatively, a dedicated controller (hardware) for each function may be provided and each process performed independently of any other.

The operation panel 120, as described above, sets and/or displays a variety of states of the LBP 100. The output controller 3108 converts the contents (image data) of the band memory (that is, the page memory) to a video signal VDO and transfers the VDO to the printer engine 3110. The printer engine 3110 has a printing mechanism for taking the video signal VDO and forming a permanently visible color image on the recording paper P, and for example, is described above with reference to FIG. 1.

Next, a description is given of the overall structure of the printing system of the present embodiment, including the host computer 3000.

In FIG. 3, the host computer 3000 outputs print information, including print data and control codes, to the LBP 100. The host computer 3000 is configured as a computer system comprising a keyboard 310 and a mouse 311 as an input device and a pointer device, as well as a display monitor 320 as a display device. The host computer 3000 runs, for example, on OS such as Windows XP™, Windows Me™ and the like.

Looking only at the functional components of the host computer 3000 that are related to the present embodiment, the functions of the OS can be broadly divided into an application software 301, a graphics sub-system 302 and a spooler 303 that includes both a print information storage means and a means of communicating with the LBP 100.

The application software 301 designates, for example, such application software as word processing and spreadsheet programs, which run on the OS that is the basic software. The graphics sub-system 302 includes a Graphical Device Interface (hereinafter "GDI") 3021 that is part of the function of the OS and a printer driver 3022 that is a device driver dynamically linked from the GDI 3021. The printer driver 3022 calculates the number of band memories and the size of each band memory used in rendering in the LBP 100 at initializing operation, based on the set information (paper size, resolution, color mode) for printing using a user interface (UI) and the LBP 100 device dependence information. In addition, the printer driver 3022 acquires an initial band spooler and manages it as the spool area for the bands calculated as described above.

Additionally, the printer driver 3022 for the PDL format is called from the GDI 3021 through an interface as the DDI (Device Driver Interface), and generates PDL commands and writes the commands into a spool file 3031. In the system according to the present embodiment, information transferred to the DDI function is converted to a print command format which can be processed at high speed by the LBP 100, and the print commands thus generated are divided and stored in the calculated spool area for the band in a band spooler 3023.

When the print data of one page is divided and stored in the band spoolers 3023 in units of band, the print commands stored in the band spooler 3023 are transmitted in succession to the spooler 303 from the first band. A command that identifies the position of each band is attached to the top of the print commands transmitted from each band of the band spooler 3023, as a result the LBP 100 can determine the band to which the print data being received belongs.

When draw commands of one page are transferred from the DDI in large numbers, it sometimes happens that the print commands qf the page cannot be stored in the band spooler 3023 acquired at the initializing process of the printer driver 3022. At such times, additional memory areas are acquired and the number of band spoolers in the band spooler 3023 is increased.

However, when draw commands exceeding the built-in memory size of the host computer 3000 are issued, the present embodiment takes the following process.

The print commands that have been already spooled in the band spooler 3023 are sequentially transmitted to the LBP 100, in order from the first band, with a number indicating the order of the band.

The print commands in all bands have been transmitted and the band spooler 3023 become empty, the remaining print commands can be stored in the band spooler 3023. When an empty area of the band spooler 3023 becomes insufficient, the above processes are repeated, so that print commands of theoretically unlimited size can be processed in a limited memory space.

The system spooler 303 is a spool file system that the OS manages. Depending on the settings, the system spooler 303 spools print data to the spool file 3031 in units of either one page or one job, and then transmits to the LBP 100 through an I/F 3032.

It should be noted that, depending on the basic OS, the names and functional framework of that which is described above might vary slightly. However, provided there is a module that can implement the technical means according to the present embodiment, such variation in nomenclature and framework does not pose a significant problem for the present invention. For example, that which is described above as the spooler 303 and the spool file 3031 may be implemented by including their processing in a module called a print queue in another OS.

It should be noted that, in general, the host computer 3000 that includes the above-described functional modules is configured so that the OS controls such hardware such as a central processing unit (CPU), a read-only memory (ROM), a random access memory (RAM), a hard disk drive (HDD) and an input/output controller (I/O), with particular application software and sub-system processes running as functional modules under the control of the OS.

[Print Data Format]

Figure 4:
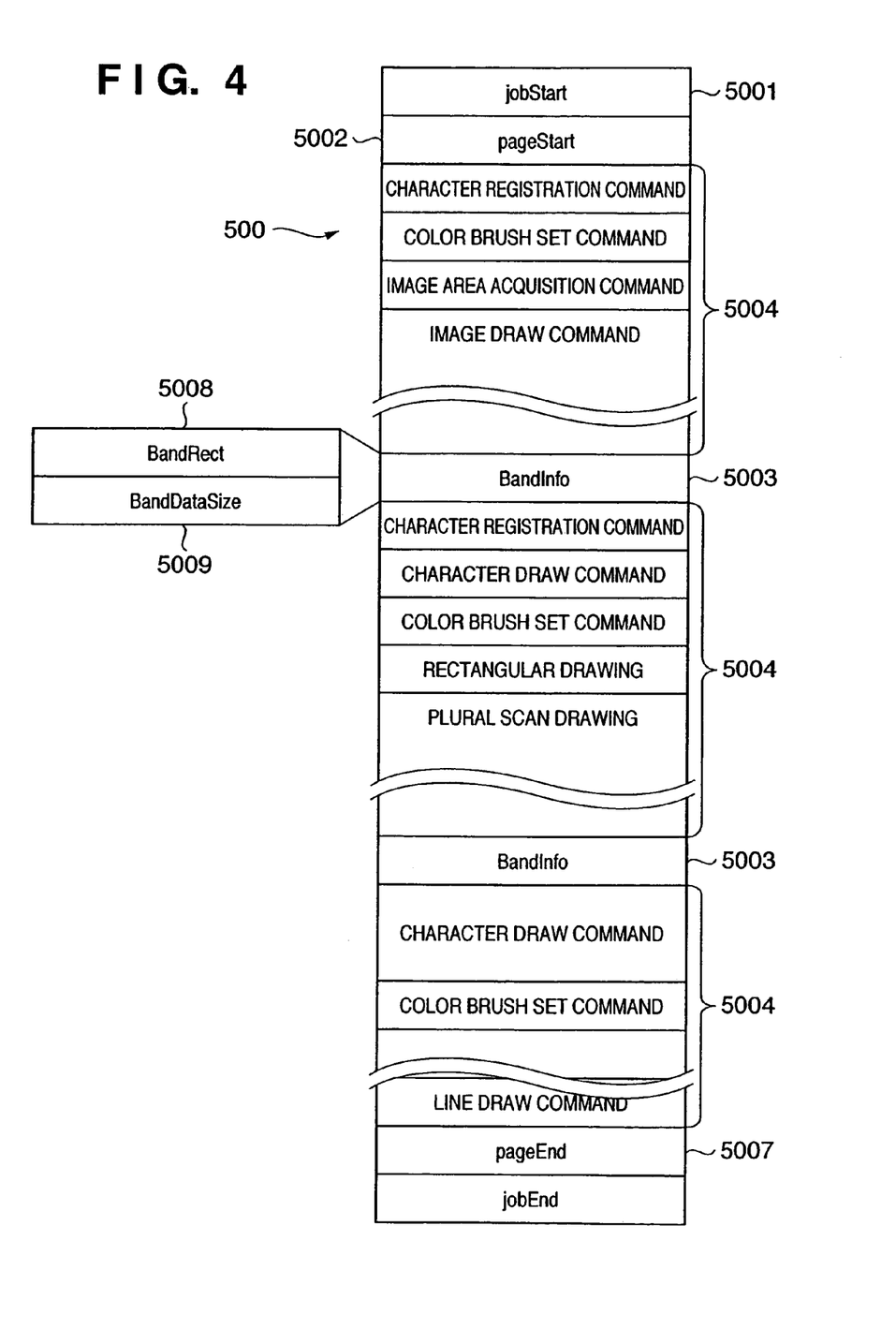
FIG. 4 depicts a schematic diagram showing a structure of print command according to the embodiment of the present invention.

FIG. 4 depicts a schematic diagram showing a structure of the print command according to the embodiment of the present invention.

In the diagram, reference numeral 500 denotes print command for one job. The print command 500, like a typical PDL, starts with a job start command (jobStart) 5001 and continues with a page start command (pageStart) 5002 that indicates the start of one page. Reference numeral 5004 denotes print commands of one band. Reference numeral 5003 denotes band information (BandInfo), which includes a BandRect 5008, indicating the location of the print commands 5004 of the succeeding band, and a BandDataSize 5009 indicating the amount of the print commands of the band. Following the band information 5003, at the location indicated by the BandRect 5008, the print commands 5004 in units of bands of the data size specified by the BandDataSize 5009 is repeatedly arranged for the page. Then, at the end of the page, a pageEnd 5007 is attached and the end of the print job is indicated by the following jobEnd.

[Printer Driver Processing]

Figure 5:
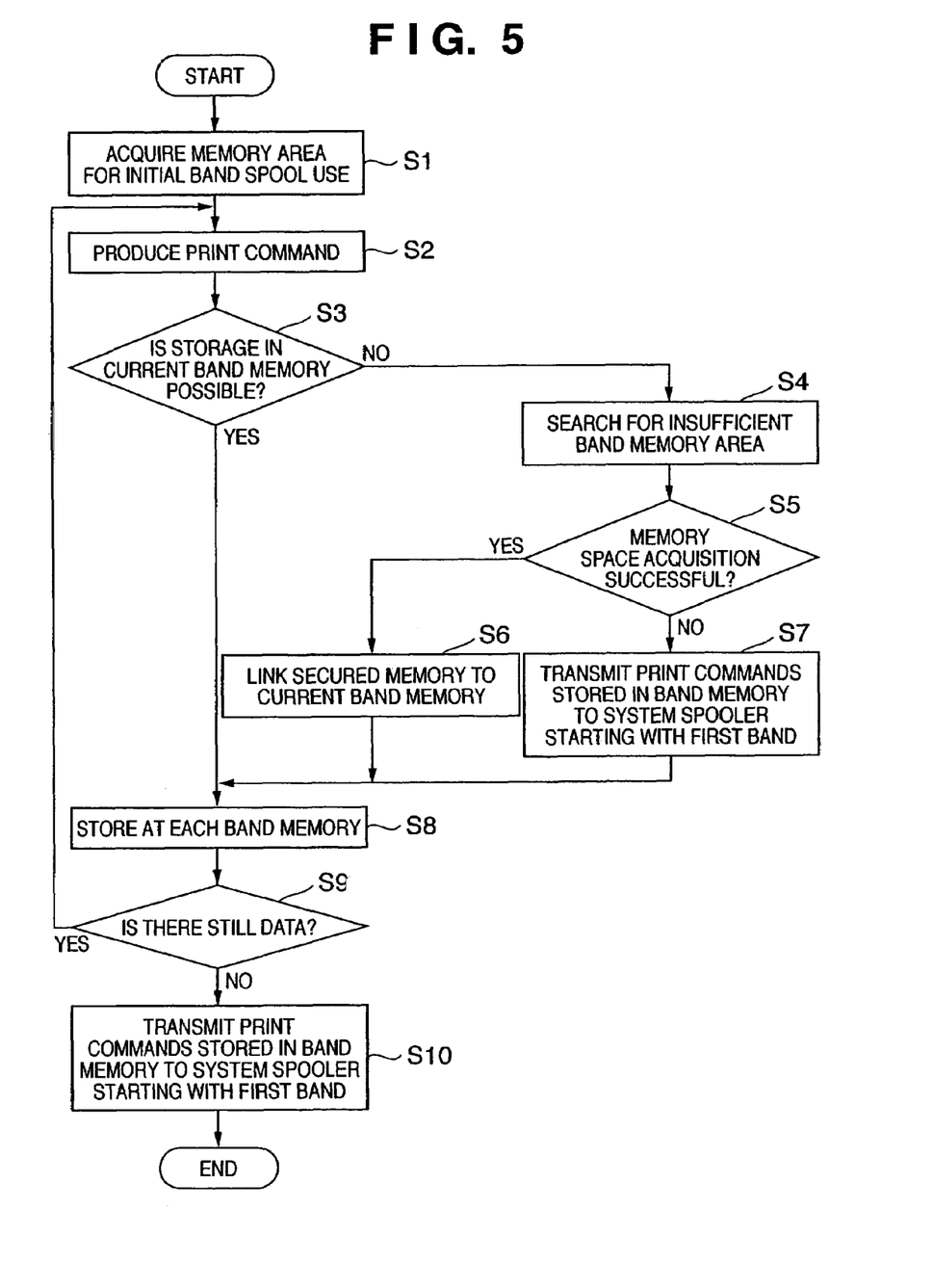
FIG. 5 is a flow chart showing processing flow in a printer driver according to the embodiment of the present invention.

FIG. 5 is a flow chart showing processing flow in the printer driver 3022 according to the embodiment of the present invention.

First, in a step S1, initialization of the printer driver 3022 is executed, information relating to the band to be processed by the LBP 100 (that is, band size) is acquired, and the memory area for the band spooler 3023 is acquired in correspondence to the size of the band. Next, processing proceeds to a step S2, the printer driver 3022 receives drawing data from the OS and divides the drawing data for each band and creates the print commands. Next, processing proceeds to a step S3, it is determined whether or not the print commands produced in the step S2 can be stored in the acquired memory area for the band spooler 3023. When it is determined that the print commands cannot be stored in the memory area, processing proceeds to a step S4, where a memory area for the exceeded print commands is searched. Processing then proceeds to a step S5, it is determined whether or not the memory area for the exceeded print commands can be acquired, and, if it has not been possible to acquire the memory area, processing proceeds to a step S7, the print commands stored in the band spooler 3023 are sent to the spooler 303 with information indicating the location (the order of the band) of the band, starting with the first band. If in step S5 the required memory area has been obtained, then processing proceeds to a step S6 and the obtained memory area is linked to the band spooler 3023, expanding the band spooler space.

After executing steps S6 or S7 or in a case where the print commands can be stored in the current band memory at step S3, processing proceeds to a step S8, where the print commands are stored in the corresponding memory area of the band spooler 3023. Processing then proceeds to a step S9, it is determined whether or not unprocessed drawing data of the current page remains, and, if so, returns to step S2, executing the processes described above, and, if not, proceeding to a step S10, the print commands stored in the band spooler 3023 are transmitted to the spooler 303 starting with the first band. In this case, the band information 5003 indicating the band location and size is attached for each band and when production of all the band data is completed, the pageEnd 5007 and jobEnd are attached to the end of the print commands as shown in FIG. 4.

It should be noted that, if there is spare area in the memory and the print commands are output to the printer via the process of step S6 described above, printing can be conducted at high speed because the printer 100 can start print processing without waiting for the completion of receiving print data of one page. This is because the print data of the page is continuously transmitted from the spooler 303 to the printer 100.

On the other hand, if there is no spare area in the memory and the print commands are output to the printer via the process of step 7, the printer 100 waits for the completion of receiving the print commands of the page, and, based on the received print commands, the printer 100 produces the intermediate data in band units and begins printing after the completion of producing the intermediate data of the page. Thus printing can be carried out by the printer 100, although at a printing speed that is slower than that of the process via step S6.

[Print Process at the LBP 100]

Figure 6:
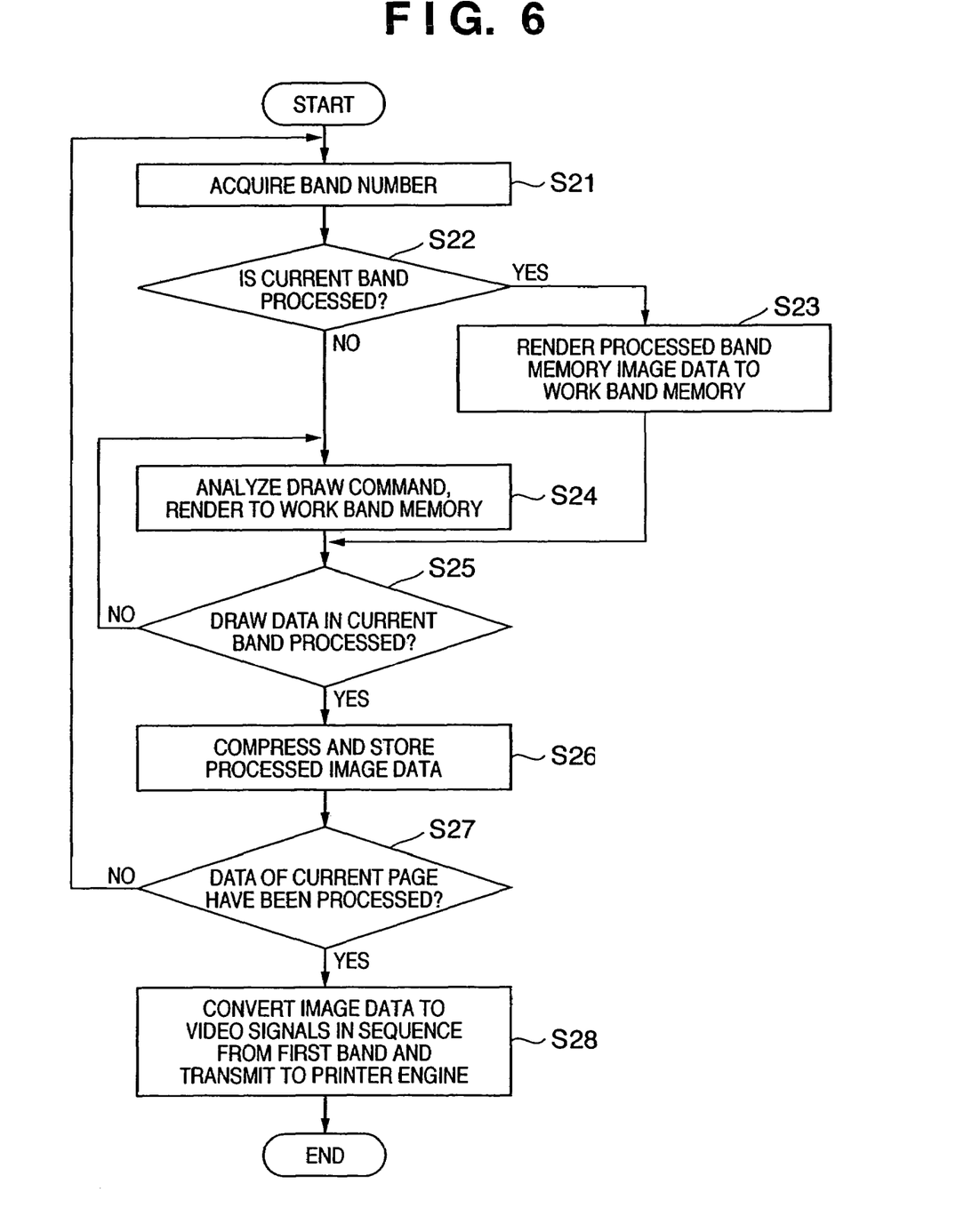
FIG. 6 is a flow chart showing a flow of data processing in units of bands, in the LBP according to the embodiment of the present invention.

FIG. 6 is a flow chart showing a flow of data processing in the LBP 100 according to the embodiment of the present invention, having received print commands transmitted from the host computer 3000.

First, in a step S21, the band information 5003 is read and a band number indicating the location of the current band is acquired. Next, processing proceeds to a step S22, where it is determined whether or not the current band has already been rendered. If so, then processing proceeds to a step S23, and if the current band is not processed at all, processing proceeds to a step S24. In step S23, the image data of the current band is developed in the band memory area for rendering processing. Processing then proceeds to step S24 and, using the band memory area, executes the process of rendering the print commands. Next, processing proceeds to a step S25, it is determined whether or not the processing of drawing data of the current band is finished, and, if so, processing proceeds to a step S26. When not-yet-processed drawing data remains at step S25, processing then returns to step S24 and the processes described above are executed.

Processing proceeds to step S26 when processing of the drawing data of the current band is completed as described above, and the bit map data rendered in the band memory is compressed and stored. Next, processing proceeds to a step S27, it is determined whether or not processing of the current page of image data is finished. If the processing of the current page of image data is not finished, then the process returning to step S21, and proceeding to a step S28 if processing is finished. At step S28, the compressed image data is converted into a video signal VDO starting with the compressed image data of the first band and the video signal VDO is transmitted to the printer engine 3110 for printing.

[Data Structure in Band Spooler 3023]

Figure 7:
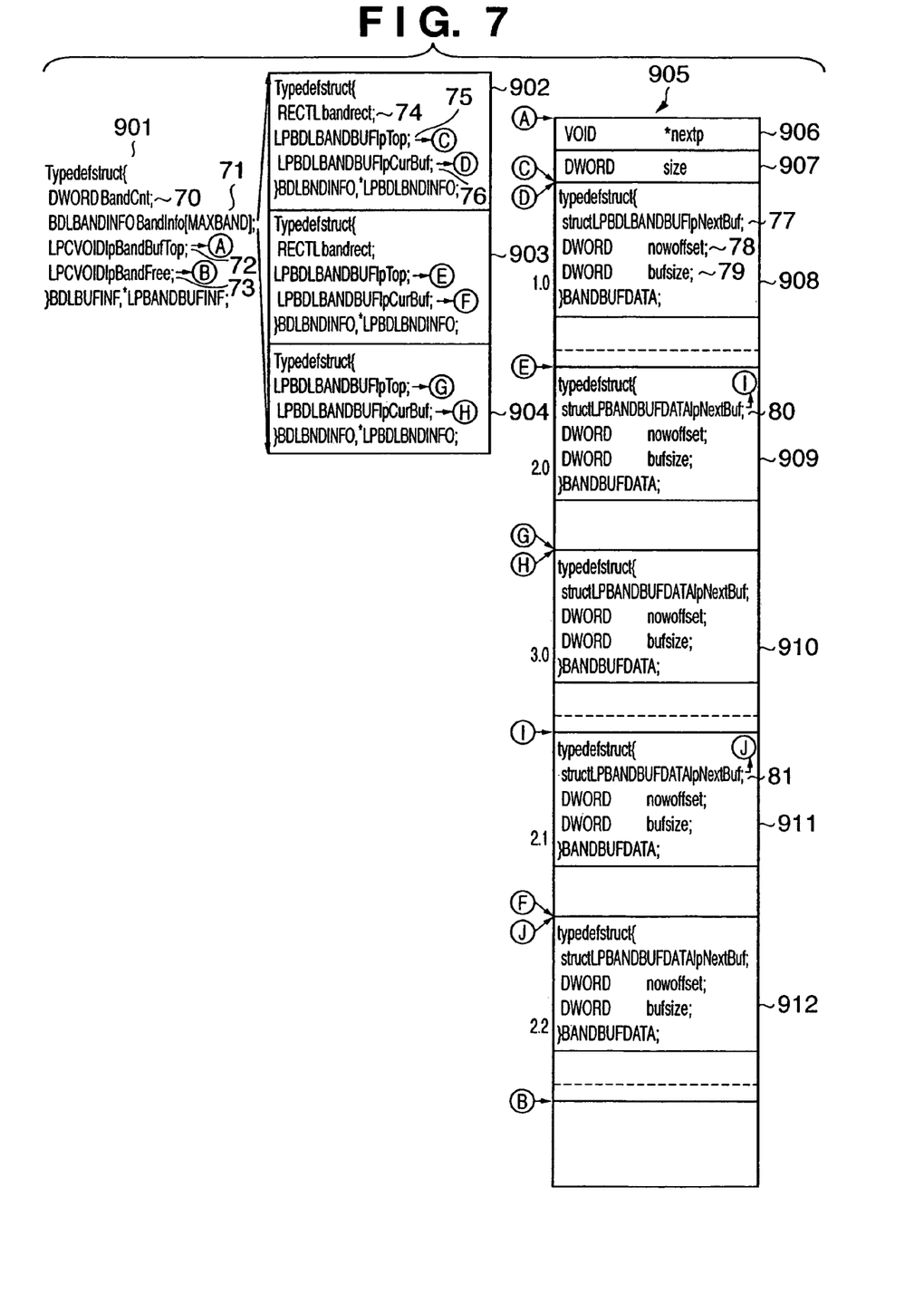
FIG. 7 depicts a schematic diagram illustrating a structure of a band spooler that the printer driver manages, according to the embodiment of the present invention.

FIG. 7 depicts a schematic diagram illustrating a structure of the band spooler 3023 that the printer driver 3022 manages, according to the embodiment of the present invention.

When the printer driver 3022 is initialized, based on a paper size from the DDI, the resolution and output paper size from the UI settings, the band size and number of bands to be processed at the printer 100 are calculated based on them.

From the above-described information, the following memory area is acquired.

(1) Band Spooler Management Structure

A "BDLBUFINF" 901 includes a "BandCnt" 70 indicating the number of bands, a "BandInfo" 71 of "BDLBANDINFO" that is an array of the structure that stores information on the bands, a "lpBandBufTop" 72 indicating the top address of the band buffer, and a "lpBandBufFree" 73 indicating the address of empty area in the band buffer. It should be noted that "BandInfo"s 71 are acquired in corresponding to the value of "BandCnt" 70.

The structure (902, 903, 904) of the "BDLBANDINFO" 71 comprises a "bandrect" 74 indicating the band area, an "lpTop" 75 indicating the top address of the memory area managed by the structure, and an "lpCurBuf" 76 indicating the memory area currently available for writing.

(2) Band Spooler

The memory area for actually storing the print commands divided among the bands that is acquired at the initializing is of a size capable of storing ordinary print data, and as shown by reference numeral 905, is divided and used. The structure 905 will be explained later.

A "nextp" 906 that sets a pointer to another band spooler is provided at the heading, and the area is set to "NULL" at initialization. Next, a "size" 907 is provided that indicates the size of the band spooler 3023. The preceding memory area is divided into cells, each including the "BANDBUFDATA" structure and the command storage area.

The "BANDBUFADATA" structure 908 comprises a "lpNextBuf" 77 pointer (whose initial value is NULL) to the cell that is linked, in a case where the current cell storage area becomes full and insufficient to store more data, a "nowoffset" 78 (initial value 0) indicating a data offset of the currently stored data, and a "bufsize" 79 indicating the size of storage area.

In an initial state, an area 908 for "BANDBUFDATA" is allocated to each band and the address of "BANDBUFDATA" is set to the "lpTop" 75 and "lpCurBuf" 76, respectively, of the "BDLBNDINFO" array. In FIG. 7, the management structure ("BDLBNDINFO") 902 of the band 1 is allocated to the band spooler area ("BANDBUFDATA") 908, the management structure ("BDLBNDINFO") 903 of the band 2 is allocated to the band spooler area ("BANDBUFDATA") 909, and the management structure ("BDLBNDINFO") 904 of the band 3 is allocated to the band spooler area ("BANDBUFDATA") 910, respectively.

FIG. 7 shows a state in which, while storing print commands thereafter, the print commands have become unable to be stored into the second band spooler area 909 and the band spooler areas 911 and 912 have also been allocated and used as areas for the second band.

Then, when print commands of one page can not be stored into the band spooler 3023 acquired at the initializing, additional band spooler 3023 is obtained, a top address is attached to the "nextp" 906 of the band spooler 3023 and the "lpBandFree" 73 of the "BDLBUFINF" 901 is also updated to indicate a new band spooler.

Thus, stored print commands are output as described below.

With reference to the "bandrect" 74 of the management structure 902 of the "BandInfo" of the first band in the band spooler management structure 901, the band location (that is, (leftX, topY), (rightX, bottomY)) of the band and the amount of print commands included in the band are acquired and transmitted to the spooler 303 as a band information command. Then, the print commands stored in the band spooler area 908 indicated by "lpTop" 75 are transmitted to the spooler 303 to the extent specified by the "nowoffset" 78 of the "BANDBUFDATA". Here, in a case where the value of the "lpNextBuf" 77 of the "BANDBUFDATA" is "NULL", in other words, in a case where there is no band spooler area linked to the band spooler area, the process advances to processing of the next band spooler area that should be processed and shifts to the next "BandInfo" structure (here, 903).

As for the second band, print commands are also similarly output to the spooler 303 from the band spooler area 909 indicated by the "lpTop" 75 of the "BDLBNDINFO" 903. In this case, the "lpNextBuf" 80 of the band spooler area 909 indicates the band spooler area 911, while the "lpNextBuf" 81 of the band spooler area 911 indicates the band spooler area 912. Therefore, in this sequence, the second band's print commands are transmitted to the spooler 303. At the band spooler area at which such output is finished, the values for "lpNextBuf" and "nowoffset" are returned to their initial states ("NULL" and "0").

OTHER EMBODIMENTS

As described above, the object of the present invention may also be accomplished by supplying a system or an apparatus with a storage medium (or a recording medium) in which a program code of software that implements the functions of the above-described embodiment is stored, and causing a computer (or CPU or MPU) of the system or apparatus to read out and execute the program code stored in the storage medium. In this case, the program code itself read from the storage medium realizes the functions of the above-described embodiment, and hence the program code and a storage medium on which the program code is stored constitute the present invention. Examples of the storage medium for supplying the program code include a floppy disk, a hard disk, a magneto-optical disk, a CD-ROM, a CD-R, a CD-RW, a DVD-ROM, a DVD-RAM, a DVD-RW, a DVD-RW, a DVD+RW, a magnetic tape, a non-volatile memory card, and a ROM. Alternatively, the program may be supplied by downloading form another computer, a database, or the like, not shown, connected to the Internet, a commercial network, a local area network, or the like.

Further, it is to be understood that the functions of the above-described embodiments may be accomplished not only by executing the program code read out by a computer, but also by causing an OS (operating system) or the like which operates on the computer to perform a part or all of the actual operations based on instructions of the program code.

Further, it is to be understood that the functions of the above-described embodiments may be accomplished by writing the program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

Further, the above program has only to realize the functions of either of the above-described embodiment on a computer, and the form of the program may be an object code, a program executed by an interpreter, or script data supplied to an OS.

The present embodiment as described above can achieve proper and high-speed printing even when the print command data size is large, in an environment comprising a printer device and a host computer of limited memory size.

The present invention is not limited to the above embodiment, and various changes and modifications can be made thereto within the spirit and scope of the present invention. Therefore, to apprise the public of the scope of the present invention, the following claims are made.

What is claimed is:

1. A print system having a host computer and a printer, wherein
    the host computer comprises:
    a generation unit configured to segment drawing data into bands and to generate a print command with respect to each of the bands of drawing data;
    a storage control unit configured to store the print command generated by said generation unit into a band memory; and
    an output unit configured to output a set of print commands corresponding to one page at once and to attach information indicating a band position to each print command, in a case that the print commands of the entire one page are generated and stored into the band memory, and configured to output the print commands currently stored in the band memory while attaching the information indicating the band position to each print command, in a case that it is impossible to store the print commands of the entire one page into the band memory,
    and wherein the printer comprises:
    a rendering unit configured to receive the print command with the information and to determine whether or not a band of the received print command has been rendered based on the information, and
    (i) if the band of the received print command has been rendered, to develop compressed image data of the band stored in a memory into a work band memory, and to render image data of the received print command in the work band memory,
    (ii) if the band of the received print command has not been rendered, to render image data of the received print command in the work band memory;
    a unit configured to compress the image data of the band to store in the memory, in a case that the image data of the band has been rendered in the work band memory by said rendering unit; and
    a transmission unit configured to convert the compressed image data stored in the memory into a video signal and to transmit the video signal to a printer engine, in a case that image data of the one page has been compressed and stored in the memory.

2. A printer for communicating with a host computer,
    the host computer comprising:
    a generation unit configured to segment drawing data into bands and to generate a print command with respect to each of the bands of drawing data;
    a storage control unit configured to store the print command generated by said generation unit into a band memory; and
    an output unit configured to output a set of print commands corresponding to one page at once and to attach information indicating a band position to each print command, in a case that the print commands of the entire one page are generated and stored into the band memory, and configured to output the print commands currently stored in the band memory while attaching the information indicating the band position to each print command, in a case that it is impossible to store the print commands of the entire one page into the band memory, and the printer comprising:

a rendering unit configured to receive the print command with the information and to determine whether or not a band of the received print command has been rendered based on the information, and (i) if the band of the received print command has been rendered, to develop compressed image data of the band stored in a memory into a work band memory, and to render image data of the received print command in the work band memory, (ii) if the band of the received print command has not been rendered, to render image data of the received print command in the work band memory;

a unit configured to compress the image data of the band to store in the memory, in a case that the image data of the band has been rendered in the work band memory by said rendering unit; and a transmission unit configured to convert the compressed image data stored in the memory into a video signal and to transmit the video signal to a printer engine, in a case that image data of the one page has been compressed and stored in the memory.

3. A host computer for communicating with a printer, wherein the printer comprises:

a rendering unit configured to receive a print command with information indicating a band position and to determine whether or not a band of the received print command has been rendered based on the information, and (i) if the band of the received print command has been rendered, to develop compressed image data of the band stored in a memory into a work band memory, and to render image data of the received print command in the work band memory, (ii) if the band of the received print command has not been rendered, to render image data of the received print command in the work band memory;

a unit configured to compress image data of the band to store in the memory, in a case that the image data of the band has been rendered in the work band memory by said rendering unit; and a transmission unit configured to convert the compressed image data stored in the memory into a video signal and to transmit the video signal to a printer engine, in a case that image data of the one page has been compressed and stored in the memory, and wherein the host computer comprises:

a generation unit configured to segment drawing data into bands and to generate a print command with respect to each of the bands of drawing data;

a storage control unit configured to store the print command generated by said generation unit into a band memory; and an output unit configured to output a set of print commands corresponding to one page at once and to attach information indicating a band position to each print command, in a case that the print commands of the entire one page are generated and stored into the band memory, and configured to output the print commands currently stored in the band memory while attaching the information indicating the band position to each print command, in a case that it is impossible to store the print commands of the entire one page into the band memory.

4. A printing method, comprising:

a generation step by a generation unit of segmenting drawing data into bands and generating a print command with respect to each of the bands of drawing data;

a storage control step by a storage control unit of storing the print command generated in said generation step into a band memory;

a first output step by an output unit of outputting a set of print commands corresponding to one page at once and attaching information indicating a band position to each print command, in a case that the print commands of the entire one page are generated and stored into the band memory;

a second output step by the output unit of outputting the print commands currently stored in the band memory while attaching the information indicating the band position to each print command, in a case that it is impossible to store the print commands of the entire one page into the band memory;

a rendering step by a rendering unit of receiving the print command with the information and determining whether or not a band of the received print command has been rendered based on the information, and (i) if the band of the received print command has been rendered, developing compressed image data of the band stored in a memory into a work band memory, and rendering image data of the received print command in the work band memory, (ii) if the band of the received print command has not been rendered, rendering image data of the received print command in the work band memory;

a compression step by a compression unit of compressing the image data of the band to store in the memory, in a case that the image data of the band has been rendered in the work band memory in said rendering step; and a transmission step by a transmission unit of converting the compressed image data stored in the memory into a video signal and transmitting the video signal to a printer engine, in a case that image data of the one page has been compressed and stored in the memory.

5. A control method of a printer for communicating with a host computer, wherein the host computer comprises:

a generation unit configured to segment drawing data into bands and generate a print command with respect to each of the bands of drawing data;

a storage control unit configured to store the print command generated by said generation unit into a band memory; and an output unit configured to output a set of print commands corresponding to one page at once and to attach information indicating a band position to each print command, in a case that the print commands of the entire one page are generated and stored into the band memory, and configured to output the print commands currently stored in the band memory while attaching the information indicating the band position to each print command, in a case that it is impossible to store the print commands of the entire one page into the band memory, the method comprising:

a rendering step by a rendering unit of receiving the print command with the information and determining whether or not a band of the received print command has been rendered based on the information, and (i) if the band of the received print command has been rendered, developing compressed image data of the band stored in a memory into a work band memory, and rendering image data of the received print command in the work band memory, (ii) if the band of the received print command has not been rendered, rendering image data of the received print command in the work band memory.

6. A control method of a host computer for communicating with a printer, wherein the printer comprises:

a rendering unit configured to receive a print command with information indicating a band position and to determine whether or not a band of the received print command has been rendered based on the information, and (i) if the band of the received print command has been rendered, to develop compressed image data of the band stored in a memory into a work band memory, and to render image data of the received print command in the work band memory, (ii) if the band of the received print command has not been rendered, to render image data of the received print command in the work band memory;

a compression unit configured to compress image data of the band to store in the memory, in a case that the image data of the band has been rendered in the work band memory by said rendering unit; and a transmission unit configured to convert the compressed image data stored in the memory into a video signal and to transmit the video signal to a printer engine, in a case that image data of the one page has been compressed and stored in the memory, the method comprising:

a generation step by a generation unit of segmenting drawing data into bands and generating a print command with respect to each of the bands of drawing data;

a storage control step by a storage control unit of storing the print command generated in said generation step into a band memory;

a first output step by an output unit of outputting a set of print commands corresponding to one page at once and attaching the information indicating a band position to each print command, in a case that the print commands of the entire one page are generated and stored into the band memory; and a second output step by the output unit of outputting the print commands currently stored in the band memory while attaching the information indicating the band position to each print command, in a case that it is impossible to store the print commands of the entire one page into the band memory.

7. A computer-readable storage medium for storing a program for causing a computer to implement a control method defined in claim 5.

8. A computer-readable storage medium for storing a program for causing a computer to implement a control method defined in claim 6.

* * * * *